Figure 1:
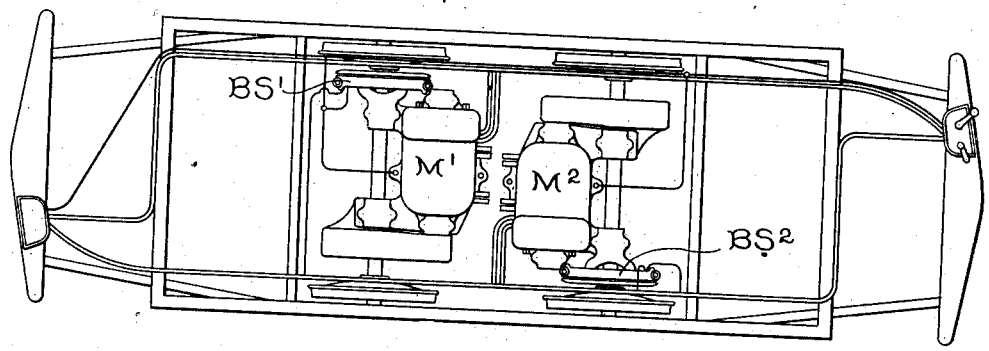

No. 736,817. PATENTED AUG. 18, 1903.
F. E. CASE.
ELECTRIC BRAKE.
APPLICATION FILED DEC. 17, 1898.
NO MODEL.
3 SHEETS—SHEET 1.

WITNESSES.
A. H. Abell.
A. F. Macdonald.

INVENTOR.
Frank E. Case,
by Albert G. Davis
Atty.

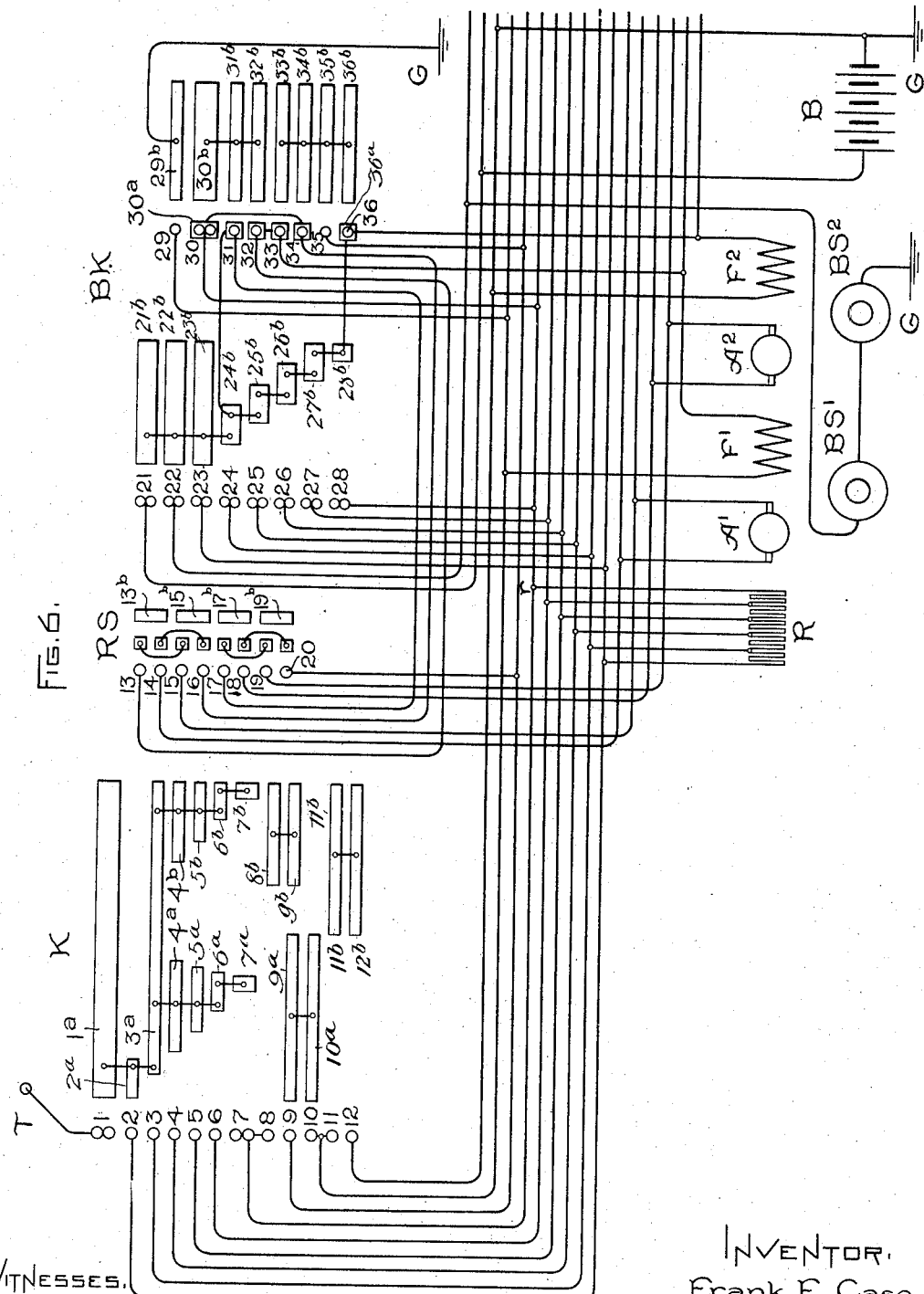

No. 736,817. Patented August 18, 1903.

UNITED STATES PATENT OFFICE.

FRANK E. CASE, OF SCHENECTADY, NEW YORK, ASSIGNOR TO THE GENERAL ELECTRIC COMPANY, A CORPORATION OF NEW YORK.

ELECTRIC BRAKE.

SPECIFICATION forming part of Letters Patent No. 736,817, dated August 18, 1903.

Application filed December 17, 1898. Serial No. 699,587. (No model.)

*To all whom it may concern:*

Be it known that I, FRANK E. CASE, a citizen of the United States, residing at Schenectady, in the county of Schenectady, State of New York, have invented certain new and useful Improvements in Electric Brakes, of which the following is a specification.

My present invention relates to the art of braking electrically-propelled vehicles, and is especially designed for use with electric railways, in which that system of braking has been most successfully developed.

It has for its object to so obviate some of the difficulties attendant upon the operation of the ordinary systems of electric braking that stops may be made more easily, certainly, and without undue jolting of the car or strain upon the apparatus.

In the operation of the ordinary and now well-known systems of electric braking, in which one or a number of brake-shoes act upon disks rotating with the axle and are supplied with current from the motors operated as generators by the momentum of the cars, a difficulty has arisen from the variations of braking effect with the same motor-circuit resistance, due to variations in speed. If, for instance, the vehicle be traveling at low speed, the voltage at the motor-terminals will be correspondingly low and the amount of resistance in circuit with the motors and brake-shoes must be much less to get the same braking effect than would be required if the vehicle were traveling at a higher rate of speed. This is true even though the coefficient of friction at the brake-shoes rises rapidly as the speed falls. It is also true that the first actuation of the brake-shoes requires a considerably larger current than is necessary to maintain adhesion after the air-gap between the shoe and the disk has been closed. If the vehicle be traveling at a high speed, the effect of the motor or motors operating as braking-generators will be at a maximum, while the frictional resistance of the brake-shoes will be at a minimum, due to the fact that the sliding friction varies inversely as the speed. As the speed of the vehicle drops the braking effect of the motor or motors will drop correspondingly, and the friction of the brake-shoes, due to the decrease in speed, will tend to increase; but because the shoes are supplied with current from the braking-generators the current in them will be decreased as the speed of the vehicle decreases, with the result that the total braking effect will actually diminish as the speed falls.

In many braking systems there is provided what is called an "emergency-stop," to be used only when accident threatens the car. This has generally been arranged so that the brake-shoes are cut out of circuit and the motors, acting as generators, are short-circuited; but this method of braking is not applicable to ordinary service conditions, although useful and valuable in emergencies, since it causes a sudden stop disagreeable to passengers and capable of causing severe strain on the motors and gears. Its principle may be applied in making ordinary stops by inserting in the circuit of the motors a sufficient resistance to prevent undue retardation; but it is then open to the objection of not bringing the car to a rest, inasmuch as after the speed has materially diminished the generation of current is so small as not to retard the rotation of the armatures sufficiently to stop the car.

The apparatus which I have devised to carry out my improved method of braking mitigates the difficulties above pointed out. The said method, which is not herein claimed, since it constitutes the subject-matter of a divisional application, Serial No. 160,161, filed June 5, 1903, consists in general of supplying current to the brake-shoes from an auxiliary source of electromotive force, preferably a storage battery, using the motors also to effect a part of the retardation of the car, but supplementing this action by the application of just so much energy from the auxiliary source as will render the braking effect substantially constant for any given motor-circuit resistance. In this arrangement the motors may or may not furnish part of the current for the brake-shoes and may be utilized directly or indirectly to regulate the braking.

The particular apparatus by which I am enabled to carry out the indicated method I have shown as consisting of one or more motors, which, it is understood, are operated as generators and which have included in their circuits a resistance regulable in amount so as to adjust the current flow in the motors to the retarding effect desired, an auxiliary source of substantially constant electromotive force, which may be a storage battery or any desired source—as, for example, the line itself—the particular source of electromotive force being unimportant, and one or more brake-shoes supplied with current from the auxiliary source. In one arrangement I close the motor-circuit through a regulable resistance and a current-measuring coil, which may be either an electromagnet or a solenoid-coil, and within its influence I provide an armature or a core, as the case may be, operating an adjustable resistance in the brake-shoe circuit, the brake-shoes being supplied with current solely from the auxiliary source, the arrangement being such that as the current generated by the motors diminishes more and more resistance is cut out of the brake-shoe circuit, so that a greater current from the auxiliary source actuates the shoes, and thus as the braking action of the generators diminishes, due to the diminished output, the action of the brake-shoes increases proportionately, so that I obtain substantially a constant effect for any given motor-circuit resistance. With this arrangement, while the actual output of the generators, and consequently their braking effect, will vary directly with the speed, the braking effect of the shoes will vary inversely with the speed. When the braking effect of the generators is small, due to the low speed of the vehicle, the braking due to the auxiliary source will be large, due to the reduced resistance in circuit with the brake-shoes and also to the fact that the coefficient of friction is greater at low than at high speeds. On the other hand, when the braking effect of the generators is large, due to the high speed of the vehicle, the braking effect due to the auxiliary source will be small, both because the resistance included in circuit with the brake-shoes will have been increased and also because the coefficient of friction of the brake-shoes will have been diminished. It will therefore be seen that by a proper proportioning of the braking effects due to the generators and to the auxiliary source the sum of the two may be made substantially constant. This does not mean, of course, that the braking effect is constant irrespective of the position of the brake-controller, because although the sum of the two effects just spoken of is constant it may be varied as a whole by changing the resistance of the motor-circuit. Under some conditions, as when running at high speed, it is manifest that the retardation of the brake-shoes is unnecessary until the speed diminishes. Under these conditions the action of the current-measuring coil, already referred to, will be to open the circuit of the brake-shoes, so that they are not operated until the speed has been materially diminished and the current flow in the motor-circuit has so far fallen as to no longer furnish the desired retardation, at which time the brake-shoes will be cut in to maintain the braking effect substantially constant, and, finally, as the motor-current falls so as to furnish practically no retardation, the frictional retardation of the brake-shoes will increase to an amount sufficient to bring the car positively to rest. Furthermore, by this method of operation I am able to hold the car at rest after it has been stopped, even though the stop is made on a grade otherwise sufficient to start the car in motion.

So many different ways of applying the invention have been devised that I have not attempted to indicate all of them, but only a few examples, from which a competent electrician may readily devise other ways of accomplishing the same results, all of which I aim to cover in the claims appended to this description.

The accompanying drawings therefore show in Figure 1 a plan view of the car-truck equipped with a pair of motors, brake-shoes, and controllers, by means of which the invention may be applied either in any of the forms illustrated or otherwise. Figs. 2 to 5, inclusive, are diagrams of connections embodying the invention; and Fig. 6 shows a controller adapted to its exercise.

Figure 2:
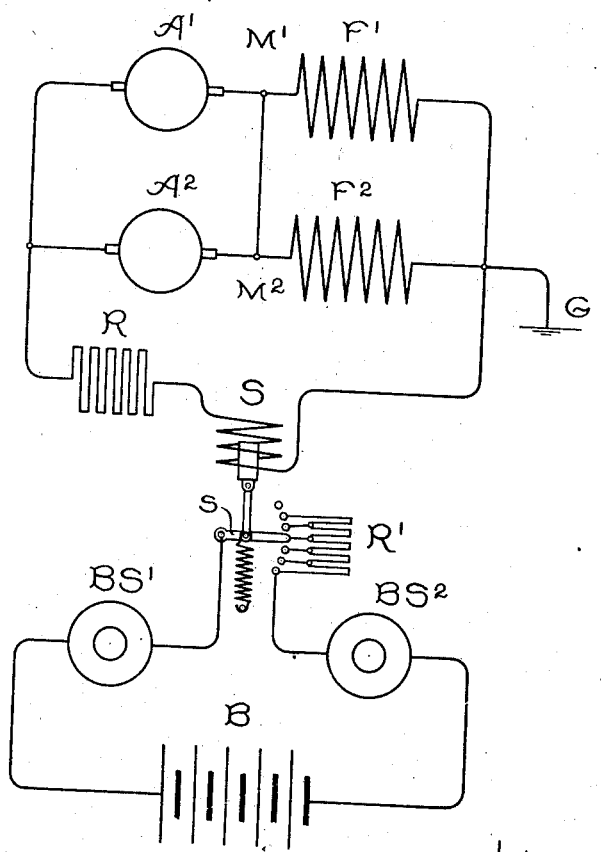

In Fig. 2, which illustrates the specific arrangement already referred to, $M'$ $M^2$ are the motors, of which $A'$ $A^2$ are the armatures and $F'$ $F^2$ the fields. R is the motor-regulating resistance, which is used in this case to determine the output of the machines when operated as momentum-driven generators. S is the solenoid in the motor-circuit operating a switch $s$, by means of which a second resistance $R'$ is controlled, so that various amounts of it may be included in circuit. This resistance is in series with the brake-shoes $BS'$ $BS^2$, one of which is supposed to be upon the axle with each motor. The shoes are supplied with current from the storage battery B, which may be charged in any desired manner. (Not illustrated in the diagram.) The operation of these parts in bringing a car to rest is as follows: The motors retard the motion of the car or other moving load by generating in the circuit including the resistance R and the coil S a current larger or smaller in proportion to the speed of the car and the resistance of the circuit. We may assume, for instance, that the speed is considerable and the resistance a moderate one, in which case so much current will be generated that the core of the solenoid will be drawn up until the switch $s$ opens the circuit of the brake-shoes and battery. Under these conditions the entire retardation will be that due to the rotation of the motor-armatures. If now from a slackening of speed current begins to fall off, the circuit of the battery will be closed by the switch $s$, but with all the resistance $R'$ in circuit, so that only a small current will flow through the brake-shoes.

Their attraction and consequent resistance to motion will be added to the retardation effected by the motors, the current will still further fall off, and more and more of the resistance R' will be cut out, until finally it will be cut out entirely, when the full current of the battery will pass through the brake-shoes, the car will be brought to rest, and as the brake-shoes will be attracted with full power the car will be maintained stationary even on a heavy grade.

Figure 3:
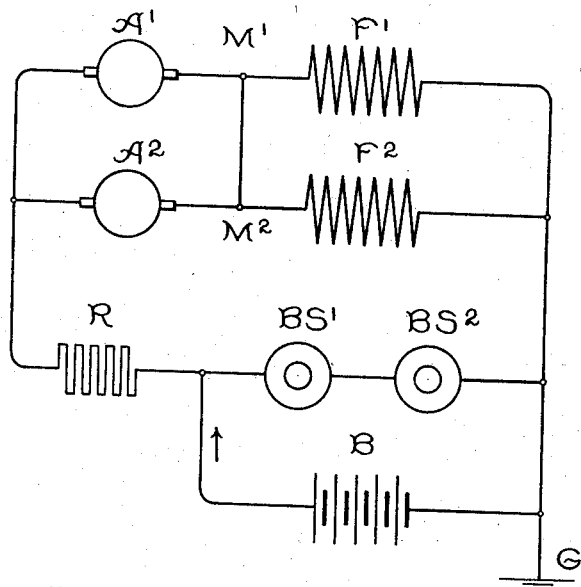

In Fig. 3 I have shown another form of the invention which also employs a storage battery. In this case the connections are such that the battery need take no energy from the line, and thus practically the only objection to its use is avoided. Here the reference-letters are the same as before, but the battery is placed in parallel with the shoes in the motor-circuit and in series with the resistance R. The action of this combination of apparatus is as follows: So long as the current generated by the motors is considerable the drop through the brake-shoes will be sufficient to force a considerable part of the current through the battery B, and thus charge it. This action will continue so long as the drop in potential across the brake-shoes is greater than the electromotive force of the battery. When these two potentials are equal, however, the battery neither receives current from the motors nor sends current through the shoes. As soon as the current from the motors operating as generators falls to such a point that the drop across the shoes is less than the electromotive force of the battery the battery begins to send current through the shoes in the direction of the arrow, thus supplying any deficiency of current as the motors slow down and maintaining the adhesion of the brake-shoes after the car comes to rest.

Figure 4:
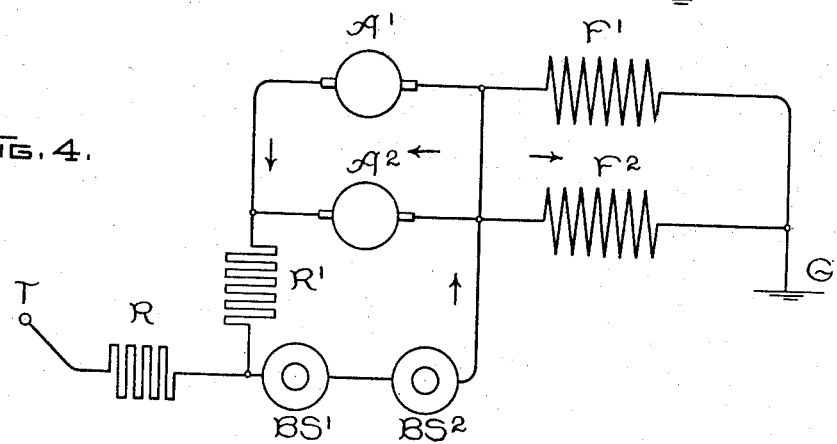

In Fig. 4 I have shown another combination of apparatus for producing a similar result. In this case I have shown the shoes as fed through a resistance from the trolley T, the circuit being grounded at G; but the storage battery may be used in the place of the trolley-circuit, or the trolley-circuit might be employed with the other combinations of apparatus shown in place of the storage battery, it being immaterial what source of current is used. In Fig. 4 in addition to the motor-regulating resistance R, I connect in multiple with the shoes a somewhat high resistance R'. The shoes should equal in resistance the resistance R', at least approximately. The circuit from the trolley or other source of current leads through the resistance R to the brake-shoes and the motor-fields, so that irrespective of the motor-armatures there will be a strong field maintained. The arrows show the course of current. The action of this combination of apparatus is as follows: The motor-armatures will be revolved by the momentum of the car, so as to give an electromotive force in the direction of the arrow. If the speed be somewhat high, this electromotive force may, owing to the strong field already mentioned, be sufficient to send current through the resistance R' and the brake-shoes, reinforcing the current from the trolley. At a certain critical speed, which may be anything desired, according to the proportioning of the apparatus, the electromotive force generated by the motor-armatures will equal the drop across the brake-shoes due to the current from the exterior source of current, and no current will pass through the resistance R', while the entire current from the trolley or other exterior source will pass through the brake-shoes and the motor-fields. As the speed diminishes the trolley-current will divide through the resistance R' and the brake-shoes until when the car has nearly come to rest a substantial portion of current may pass through the resistance and the motor-armatures, (the ohmic resistance of which is practically negligible,) thus shunting the shoes and tending to drive the armatures as motors in the reverse direction and maintaining, as before, a substantially constant braking effect.

Figure 5:
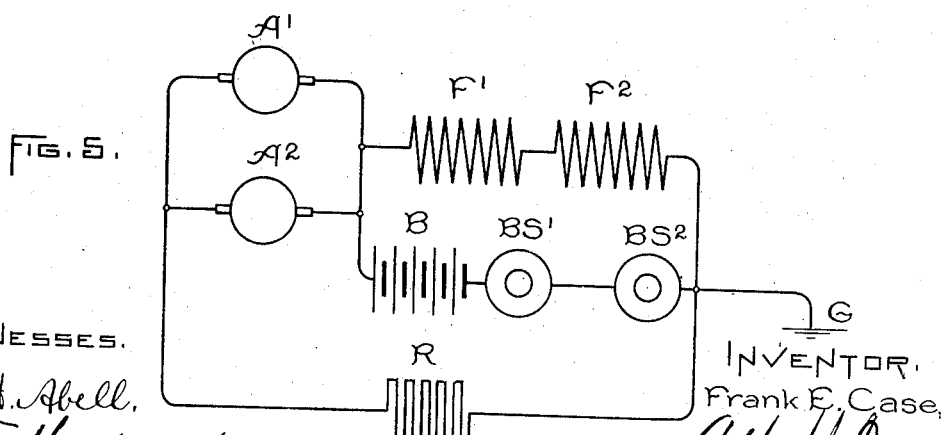

In Fig. 5 I show still another arrangement of apparatus. In this the motor-armatures are in multiple, while their fields are in series, and shunting the fields are the storage battery and the brake-shoes, these being arranged in series. The motor-regulating resistance completes the circuit both of the fields and brake-shoes, &c.

In all of the diagrams I have shown a grounded connection; but this is to be understood as representing the "ground-wire" of the controllers which is ordinarily employed in completing these circuits, and unless the trolley-current be used the ground performs no necessary function.

In the arrangement shown in Fig. 5 the battery acts as a resistance in series with the brake-shoes and tends to maintain the fields as the speed of the braking-generators drops, so that even at moderate speeds the motors have considerable effect in checking the car. In this arrangement at high speeds the drop in potential cross-fields $F'$ $F^2$ will be sufficiently great to cause current generated to be shunted through the battery, charging it and then passing through the brake-shoes; but the principal part of the retardation will be that due to the revolution of the motor-armatures. As the speed falls off at a certain critical speed the electromotive force of the battery will balance that of the armatures and no current will pass through the brake-shoes; but when the speed falls a little lower the electromotive force of the battery will preponderate, and while still sending current through the fields to maintain the magnetization it will also send current through the brake-shoes in the reverse sense, first demagnetizing them and then reapplying them, so that when the car comes to rest the shoes will be applied to hold it. At the same time a strong field will be generated, so that a quick stop may be made immediately after the car starts even though still at low speed—an emergency which sometimes arises and which has not been provided for with some forms of electric brake.

It will be noted that in each of the arrangements shown in Figs. 2 to 5, inclusive, the current which flows through the brake-shoes is a function both of the electromotive force of the motors when operating as brakes and also of the electromotive force of the auxiliary source. In other words, any variation in the electromotive force of the motors or any variation in the electromotive force of the separate source will produce a corresponding change in the current flowing through the brake-shoes.

In Fig. 6 I show a controller well adapted for the exercise of my invention. This particular controller is adapted to make the connections illustrated in Fig. 3; but the modifications necessary to adapt it to make the connections illustrated in the other figures will be readily understood by those skilled in the art. Of course the one controller is to be taken as typical of all of those which may be employed. It comprises a motor-controlling switch K, which is used when the motors are operated by current from the trolley T, a reversing-switch RS, and a brake-controller BK, which connects the apparatus, so that the motors act as generators in a now well-understood way. The fixed contacts of the different switches are numbered from 1 to 36, consecutively, and the moving contacts bear the same numbers with additional reference-letters, such as $1^a$, &c., this being a well-known system used in lettering such diagrams. The controller K connects the motors in series or in parallel, the movable contacts engaging with the fixed contacts 4 to 7, inclusive, shifting the resistance in ways now well understood in the art, while the lower contacts, engaging the fixed contacts 8 to 12, inclusive, serve to connect the motors in different combinations. When the contacts 9 to 12, inclusive, for instance, are just touching the contacts $9^a$, $10^a$, $11^b$, and $12^b$, a shunt is thrown around one of the motors, and its circuit is then opened, as contacts 9 and 10 pass off the contact-plates, until when contacts $8^b$ and $9^b$ touch contacts 8 and 9 the second motor is connected in multiple with the first and in series with a portion of the resistance, which is progressively cut out by the contacts $4^b$ and $7^b$. This is a well-known system of control and not claimed in this application. The reversing-switch is of the usual construction and consists of certain cross-connected contacts, by which the relation of armature and field in the motors may be reversed. The brake-switch BK is provided with three sets of contacts, those on the left simply serving to shift the resistance R in a well-known way. The intermediate contacts on which the brushes rest in the off position of the brake-switch are simply for convenience in effecting the necessary connections, while those contacts upon the right connect the motors, brake-shoes BS', $BS^2$, and battery B, as presently to be described. I will trace only the first circuit from the controller K, with the motors in series and full resistance in circuit, the others being unnecessary to describe and readily determined. Current passes from the trolley T to fixed contact 1, thence through contacts $1^a$ and $2^a$ in controller K to fixed contact 2, thence through the resistance R to the point $r$, thence to fixed contact 30 of the brake-switch, by the cross-connected contacts to fixed contact 34, thence to fixed contact 16 of the reversing-switch, by cross-connected contact on said switch to fixed contact 14, through the armature A', contacts 15 and 13 on the reversing-switch, contact 32 of the brake-switch, through cross-connected contacts of said brake-switch to contact 33, through the field F', fixed contact 10 of the controller K, to contact 9, to contact 20 of the reversing-switch, by cross-connected contacts on said switch to fixed contact 18, armature $A^2$, contact 19 of the reversing-switch, contact 17, contact 31 of the brake-switch, then by cross connection to contact $24^b$, and through cross connections to contact $36^a$, brush 36, through the field $F^2$, and out at ground. The other functions of the controller have already been briefly described. When now the brakes are to be operated, the controller K will be in its "off" position, in which the brushes 1 to 12, inclusive, are inoperative. The movement of the switch BK to apply the brakes first causes the contacts $30^a$ to $34^a$, inclusive, and $36^a$ to pass from under the corresponding fixed contacts and then brings the contacts $21^b$ to $28^b$, inclusive, and $29^b$ to $36^b$, inclusive, into engagement with the two sets of fixed contacts 21 to 28, inclusive, and 29 to 36, inclusive, respectively. In the first operative position of the switch the contacts $21^b$ to $23^b$, inclusive, and $29^b$ to $36^b$, inclusive, touch their respective fixed contacts, the reversing-switch remaining in the same position as before, with the cross-connected contacts touching the fixed contacts 13 to 20, inclusive. As a convenient starting-point in tracing the circuit for this position we may take the end $r$ of the resistance R, from which the circuit passes to contact 30, contact $30^b$, and by cross connections to $31^b$ and $32^b$. From these latter contacts circuits lead to the respective motor-armatures as follows: from $31^b$ through fixed contact 31 to fixed contact 17 of the reversing-switch, through the reversing-switch contacts to fixed contact 19, through armature $A^2$, (which, it will be observed, is in the reverse relation to its field, as will presently be noted,) to fixed contact 18, through reversing-switch contacts to fixed contact 20, back to the brake-switch at contact $35^b$, also from $32^b$ through fixed contact 32 to fixed contact 13 of the reversing-switch, through reversing-switch contacts to fixed contacts 15, through armature A' to fixed contact 14, through reversing-switch contacts to fixed contacts 16, back to the brake-switch at 34$^b$. These contacts being connected by a cross connection form the equalizer at the armature end of the fields. The fields are in circuit, respectively, with contacts 33$^b$ and 36$^b$, as follows: from contact 33$^b$ through the field F' in the same direction as when the machine acts as a motor and to ground by way of fixed contact 29 and movable contact 29$^b$, from contact 36$^b$ through the field F$^2$ and to ground directly. Of course it is understood that in this case "ground" means the ground-wire of the controller, as already explained. Starting again at the point $r$ of the resistance, the circuit passes in the other direction through the resistance to contact 23 of the brake-switch BK, which is cross-connected to contacts 21$^b$ and 22$^b$. From contact 21$^b$ the circuit passes through the storage battery B to ground and from 22$^b$ through the brake-shoes BS' BS$^2$ in series and in multiple with the battery B to ground. As the brake-switch is rotated the resistance-contacts gradually cut out the entire resistance R in a way well understood, the system operating in the manner described.

What I claim as new, and desire to secure by Letters Patent of the United States, is—

1. In an electric braking system, one or more motors connected to operate as momentum-driven generators, a brake shoe or shoes, an auxiliary source of current, and means for increasing the current supplied to the shoes from the auxiliary source as the current generated by the motors decreases.

2. In an electric braking system, a moving load, one or more dynamo-electric machines connected to operate as momentum-driven generators, a brake shoe or shoes, means for applying said brake-shoes, means operating automatically to cause the braking effect of the brake-shoes upon the load to increase as the braking effect of the dynamo-electric machines decreases and to hold the load after it comes to rest.

3. In an electric braking system, one or more motors connected to operate as momentum-driven generators, a brake shoe or shoes, an auxiliary source of current, and means for supplying current from said source to said shoes after the current in the motor-circuit has fallen below a certain predetermined limit, and while the motors are still operating as momentum-driven generators.

4. In an electric braking apparatus, one or more motors and electric brake-shoes, means for retarding the moving load by the action of the motors as momentum-driven generators and by the brake-shoes, and means for so proportioning the two retardations that for any given motor-circuit resistance their sum is practically constant.

5. In an electric braking system, one or more dynamo-electric machines, an electric brake shoe or shoes, means for connecting the dynamo-electric machines to operate as generators driven by the momentum of the load, means for connecting the brake-shoes in circuit with said generators, and means for simultaneously connecting the brake-shoes to another source of supply, whereby the braking effect of the shoes will be maintained during retardation and after the load has come to rest.

6. In an electric braking system, the combination of braking-generators, an auxiliary source of current, brake-shoes, and means for regulating the current supplied from said auxiliary source to said brake-shoes inversely as the current flowing in the circuit of the braking-generators.

7. In combination in an electric braking system, one or more dynamo-electric machines adapted to be operated as generators driven by the momentum of a moving load, an auxiliary source of current, a brake shoe or shoes, and means for so connecting the brake-shoes to the auxiliary source and to the circuit of the dynamo-electric machines that the energy of both sources will be utilized simultaneously to brake the load.

8. As a means for retarding the moving load, the combination of a source of electromotive force, an auxiliary source opposed to the first, and means for simultaneously utilizing energy from both sources to resist the movement of the load.

9. In an electric braking apparatus, the combination of a motor or motors driven as generators by the momentum of the moving load and one or more electric brake-shoes, with means for regulating the braking effect of the shoes in inverse ratio to that due to the current in the motors.

10. In an electric braking apparatus, the combination with one or more motors and electric brake-shoes, of a source of current separate from the motors supplying the shoes, and means for regulating the current supplied from the separate source in inverse ratio to that generated by the motors.

11. In a braking apparatus, the combination of one or more electric motors and brake-shoes, with an auxiliary source of electromotive force, means for supplying to the shoes a current which is a function of the electromotive forces produced by the motors and the exterior source, and means for regulating the two components so that as the retarding effect due to the motors tends to fall off the retarding effect due to the shoes tends to increase proportionately.

12. In an electric braking apparatus, the combination of brake-shoes in series with the motors, and a storage battery permanently connected in shunt to the shoes during braking.

13. In an electric braking apparatus, the combination of one or more electric motors and brake-shoes, with a source of electromotive force permanently connected in series with the motors and in shunt to the brake-shoes during braking and acting as a regulator of the braking effect.

14. In an electric braking apparatus, a controlling device provided with contacts for regulating the motors from rest to full speed, and contacts and connections for throwing the motors operating as braking-generators into a local circuit containing brake-shoes and a regulating resistance, and a storage battery permanently connected in multiple with the brake-shoes and in series with the motors during braking.

15. In an electric braking system, comprising one or more dynamo-electric machines connected to operate as momentum-driven generators supplying current to a brake shoe or shoes, a storage battery permanently connected in circuit during braking, so that it will first be charged by the current generated by the dynamo-electric machines operated as braking-generators and will thereafter discharge through the brake-shoes so as to maintain the braking effect and hold the car on a grade.

16. In an electric braking system comprising one or more dynamo-electric machines connected to operate as momentum-driven generators supplying current to a brake shoe or shoes, a storage battery permanently connected in shunt to said brake shoe or shoes during braking.

17. In an electric braking system comprising one or more dynamo-electric machines connected to operate as momentum-driven generators supplying current to a brake shoe or shoes, an auxiliary source of current-supply permanently connected in shunt to the brake shoe or shoes during braking.

18. In an electric braking system, one or more dynamo-electric machines connected to operate as momentum-driven generators, a brake shoe or shoes supplied with current therefrom, and means operating automatically to maintain the braking effect of the shoes as the braking effect of the dynamo-electric machines decreases and after the said machines have ceased to generate current.

In witness whereof I have hereunto set my hand this 12th day of December, 1898.

FRANK E. CASE.

Witnesses:
  B. B. HULL,
  J. LE D. LANGDON.